(12) United States Patent
Subramanian et al.

(10) Patent No.: US 10,306,547 B2
(45) Date of Patent: May 28, 2019

(54) INTELLIGENT ACCESS POINT SCANNING BASED ON A PROFILE

(71) Applicant: Microsoft Technology Licensing, LLC, Redmond, WA (US)

(72) Inventors: Sudharssun Subramanian, Bellevue, WA (US); Parmjeet Singh, Bellevue, WA (US); Shahar Marom, Redmond, WA (US); Aman Arneja, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/636,222

(22) Filed: Jun. 28, 2017

(65) Prior Publication Data
US 2019/0007894 A1    Jan. 3, 2019

(51) Int. Cl.
*H04W 4/02*    (2018.01)
*H04W 48/16*    (2009.01)
(Continued)

(52) U.S. Cl.
CPC .......... *H04W 48/16* (2013.01); *H04L 67/306* (2013.01); *H04W 4/02* (2013.01); *H04W 64/00* (2013.01);
(Continued)

(58) Field of Classification Search
CPC ... H04W 48/16; H04W 64/00; H04W 84/042; H04W 84/12; H04W 88/08; H04W 60/00;
(Continued)

(56) References Cited

U.S. PATENT DOCUMENTS

| 7,515,575 | B1 * | 4/2009 | Shi | ........................ | H04W 48/10 370/338 |
|---|---|---|---|---|---|
| 8,670,425 | B1 | 3/2014 | Xue et al. | | |

(Continued)

FOREIGN PATENT DOCUMENTS

| CN | 103458440 A | 12/2013 |
|---|---|---|
| CN | 105744607 A | 7/2016 |
| JP | 2014217023 A | 11/2014 |

OTHER PUBLICATIONS

Yao, et al., "Energy efficient indoor tracking on smartphones", In Journal of Future Generation Computer Systems, vol. 39, Oct. 2014, pp. 44-54.

(Continued)

*Primary Examiner* — Nathan S Taylor (57) ABSTRACT

The methods described herein are configured to collect profile data on a device, scan for access points based on the profile data, and update a machine learning (ML) component based on feedback from the scan. Profile data is collected on a device as input to the ML component and a scan pattern is generated by the ML component based on the collected profile data, the scan pattern including a scan frequency, a scan iteration count, and a channel hint. A scan for access points is run in accordance with the generated scan pattern and the ML component receives feedback including a scanning result based on the scan for access points. ML component is then updated based on the scanning result, the scan pattern, and the profile data. Improving the ML component and thereby, the scanning efficiency of the device provides consistent network connection and improved battery performance.

20 Claims, 5 Drawing Sheets

(51) Int. Cl.
*H04L 29/08* (2006.01)
*H04W 64/00* (2009.01)
*H04W 84/04* (2009.01)
*H04W 84/12* (2009.01)
*H04W 88/08* (2009.01)

(52) U.S. Cl.
CPC .......... *H04W 84/042* (2013.01); *H04W 84/12* (2013.01); *H04W 88/08* (2013.01)

(58) Field of Classification Search
CPC ... H04W 64/006; H04W 24/02; H04W 36/32; H04W 48/14; H04W 48/20; H04W 4/02; H04W 52/0212; H04L 67/306
USPC .................. 455/434, 432.1; 370/311, 338
See application file for complete search history.

(56) References Cited

U.S. PATENT DOCUMENTS

| | | | |
|---|---|---|---|
| 9,313,720 B2* | 4/2016 | Balasubramanian | H04W 48/16 |
| 9,357,478 B2 | 5/2016 | Nagaraj | |
| 9,674,880 B1* | 6/2017 | Egner | H04W 4/029 |
| 9,779,253 B2* | 10/2017 | Mahaffey | G06F 21/577 |
| 9,801,123 B2* | 10/2017 | Law | H04W 48/16 |
| 2006/0119508 A1 | 6/2006 | Miller | |
| 2007/0091847 A1* | 4/2007 | Lee | H04W 28/18 370/331 |
| 2008/0161072 A1 | 7/2008 | Lide et al. | |
| 2009/0068970 A1* | 3/2009 | Ahmed | H04W 48/16 455/161.1 |
| 2010/0159945 A1* | 6/2010 | Brisebois | H04W 4/029 455/456.1 |
| 2010/0161720 A1 | 6/2010 | Colligan et al. | |
| 2010/0172274 A1 | 7/2010 | Wu et al. | |
| 2010/0248715 A1* | 9/2010 | Lundsgaard | H04W 48/16 455/432.1 |
| 2011/0124334 A1* | 5/2011 | Brisebois | H04W 48/16 455/434 |
| 2012/0094643 A1* | 4/2012 | Brisebois | H04W 8/245 455/418 |
| 2014/0073302 A1 | 3/2014 | Trethewey et al. | |
| 2014/0105086 A1 | 4/2014 | Chhabra et al. | |
| 2015/0189584 A1* | 7/2015 | Holostov | H04W 4/02 370/311 |
| 2016/0044181 A1 | 2/2016 | Farkas et al. | |
| 2016/0066252 A1* | 3/2016 | Parron | H04W 48/16 455/434 |
| 2016/0295372 A1* | 10/2016 | Kapicioglu | G06F 17/30241 |
| 2017/0103215 A1* | 4/2017 | Mahaffey | G06F 21/577 |
| 2017/0127304 A1* | 5/2017 | Britt | H04W 24/08 |
| 2017/0238221 A1* | 8/2017 | Santhanam | H04W 36/08 370/331 |
| 2017/0357935 A1* | 12/2017 | Fabjanski | G06N 3/08 |

OTHER PUBLICATIONS

"International Search Report & Written Opinion for PCT Application No. PCT/US2018/033990", dated Oct. 23, 2018, 14 Pages.

* cited by examiner

FIG. 5

INTELLIGENT ACCESS POINT SCANNING BASED ON A PROFILE

BACKGROUND

Modern computing devices, such as mobile phones, tablets, and laptops, provide capabilities to scan for and connect to multiple types of networks, such as Wi-Fi and cellular networks, via access points. While constantly or frequently scanning for access points may ensure that access points are identified whenever available, the scanning process requires significant power usage, resulting in rapid exhaustion of batteries in battery-powered devices. Further, in many situations, such as traveling in a car or other mode of rapid transport, the effective range of stationary access points results in little or no time to make use of connections thereto. Scanning for and connecting to transient networks/access points may result in substantial interference with network connection use due to frequent connection and reconnection with little time in between.

Further, if scanning for access points is limited to conserve battery power, ensuring consistent connection to networks may require frequent manual settings changes of the device, reducing the convenience of the user experience. Use of mobile computing devices across a variety of networks and environments demands a highly flexible solution for conserving battery power while enhancing the consistency and quality of network connections.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method comprises collecting profile data on a device as input to a machine learning (ML) component and a scan pattern is generated by the ML component based on the collected profile data, the scan pattern including a scan frequency, a scan iteration count, and a channel hint. A scan for access points is run in accordance with the generated scan pattern and the ML component receives feedback based on the scan for access points, the feedback including a scanning result. ML component is then updated based on the scanning result, the scan pattern, and the profile data.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

The computing devices and methods described below are configured to efficiently scan for and connect to access points based on profile information to provide consistent connectivity to a user of a computing device. The profile information is used to produce a scan pattern that is predicted to best matches the environment and/or mobility pattern of the device and/or user. Additionally, machine learning (ML) techniques are applied to improve and/or adapt the scan pattern generation. In this manner, the disclosure balances consistent connectivity with preservation of battery power by efficiently scanning based on a user's typical usage patterns. This enhances the use of devices throughout a variety of locations and settings, and improves the user experience.

For example, computing devices collect profile information, such as location information, network history information, and the like, and generate, by an ML component, scan patterns based on the collected information. The scan patterns dictate how and/or when the computing devices scan for access points, such that scanning may be executed more frequently when an access point is more likely to be identified or less frequently when an access point is less likely to be identified. Further, the computing devices receive feedback based on the scanning and the ML component is updated based on the feedback and other information associated with the scanning.

The user experience of a computing device as described herein is improved due to improved network connection consistency and conserved battery life (e.g., reduced power consumption). The collected information (e.g., past data such as connection history, mobility pattern, etc.) that has been assimilated by the machine learning component may be used by the computing device to predict the user's network connection preferences and/or habits. The mobility patterns of a user may be followed precisely from network to network by the scan patterns of the machine learning component, providing a seamless connectivity experience along commutes, road trips, walks, bike rides, or the like. The enhanced connection consistency provides an improved network experience, whether it be reading email, browsing websites, or streaming music or video. Further, the battery life of the computing device is improved, as inefficient scanning for access points is reduced thus reducing significant battery drain on device batteries when moving between networks. In this manner, scanning may be reduced (e.g., to a minimum), and limited to focusing on times when the user is most likely to want to connect to an access point. For example, scanning for access points is performed only the ML component has determined that the user is most likely interested in connecting to an access point.

This detailed description in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

Figure 1:
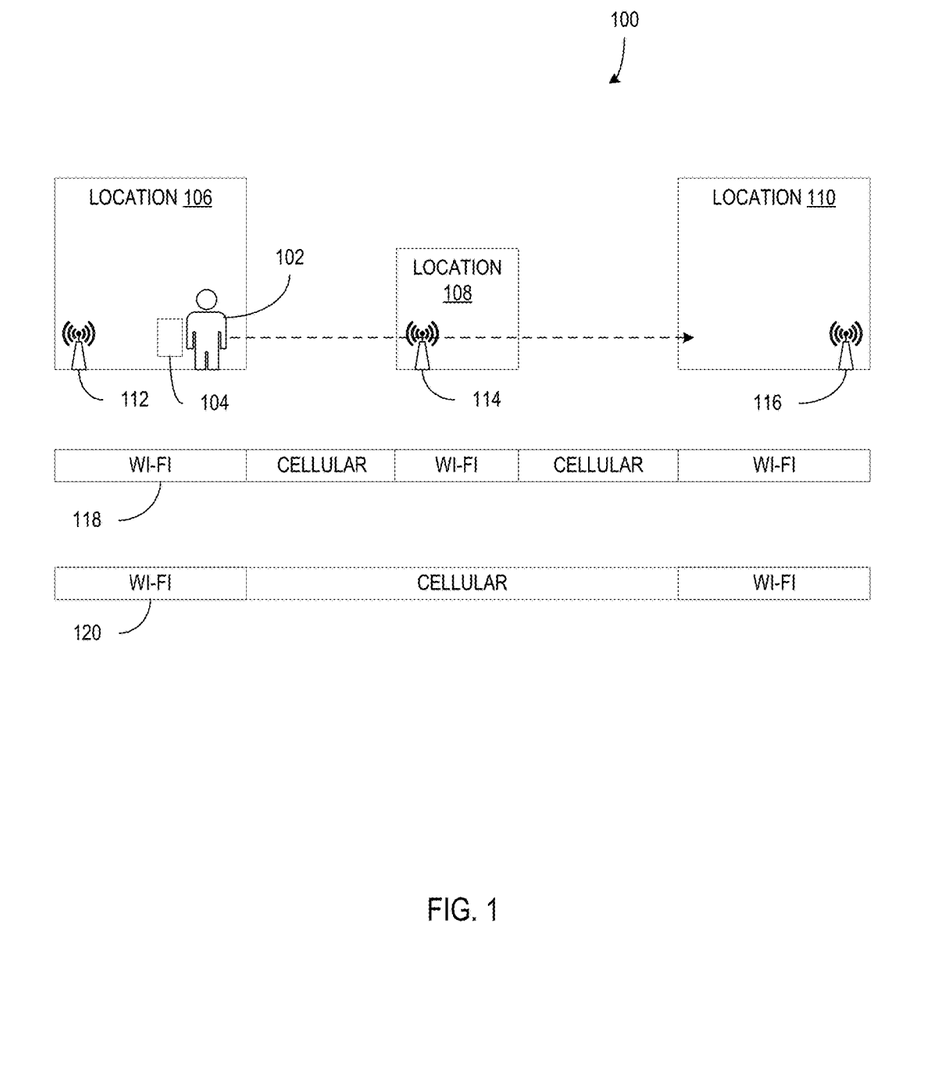
FIG. 1 is an exemplary block diagram illustrating use of a system for scanning for access points based on a profile according to an embodiment.

FIG. 1 is an exemplary block diagram illustrating use of a system 100 for scanning for access points based on a profile according to an embodiment. User 102 with a device 104 (e.g., a mobile phone, tablet, laptop, etc.) moves from location 106 to location 110 via location 108. While moving, the user 102 and device 104 enter and/or exit the ranges of Wi-Fi access points 112, 114, and 116 at the associated locations 106, 108, and 110. The device 104 is configured to connect to both Wi-Fi networks and cellular networks (although, in other examples, other types of networks are contemplated) and to switch between networks as described herein. Connection schemes 118 and 120 illustrate two connection behavior possibilities that may occur as the device 104 moves from location 106 to location 110 through location 108, in accordance with a particular scan pattern.

In an example, location 106 is user 102's home and location 110 is user 102's place of work. Location 108 is a coffee shop, news stand, or similar location at which the user 102 may temporarily stop, or slowly pass by (e.g., in traffic) while commuting from home to work. The device 104 is configured to provide consistent, useful connectivity to the user 102 throughout the commute without draining the battery of the device 104 at a greater rate than necessary through unnecessary access point scanning. For instance, the device 104 exhibits connection scheme 118 when configured with a scan pattern generated based on a determination or prediction that the device 104 will remain at location 108 long enough to justify connection to access point 114 (e.g., the user 102 typically buys coffee at location 108). In this example, the device 104 is connected to the access point 112 while the device 104 is at or near location 106 and the device 104 transitions to a cellular connection when it leaves the range of access point 112. As the user 102 and device 104 come into range of the access point 114 at location 108, the device 104 transitions to connecting via the access point 114. Finally, as the user 102 and device 104 leave the range of access point 114, the device 104 transitions to a cellular connection and, as it comes into range of access point 116 at location 110, the device 104 transitions to a connection on the access point 116.

Alternatively, the device 104 exhibits connection scheme 120 when configured with a scan pattern generated based on a determination or prediction that the device 104 will not remain long enough at location 108 to justify processing and battery power required to scan, detect, connect, transition to, and transition from, the access point 114. For example, the user is expected to not stop at location 108, but merely pass by on the way to location 110. As such, instead of connecting to the access point 114 at location 108 as the user 102 and device 104 pass near or through the location 108, the device 104 maintains the cellular connection.

The connection behavior (e.g., connection schemes 118, 120, etc.) of the device 104 results from current and/or past data gathered by the device 104 and/or input into the device 104 by the user 102. The device 104 may collect location data, time data, connection use data, etc. over time and determine the connection behavior that fits the user 102's mobility pattern/behavior (e.g., how the user moves around between locations, when the user moves between locations, and/or what access points the user's device connects to while moving between locations, etc.). This determination may be performed by a ML component and represented in a scan pattern, as described herein, which results in the connection behavior. In this way, the disclosure provides consistent connectivity and/or efficient battery consumption. For instance, the data collected may indicate that the user 102 uses a network connection heavily at or near location 108 during the user 102's commute, or otherwise stops long enough to justify connection to access point 114. In that case, the device 104 may determine that the connection behavior according to connection scheme 118 is the best fit for the user 102's typical behavior, as a connection to the access point 114 may provide more bandwidth, less cost, and/or a stronger signal than a cellular connection.

In an alternative example as described above, the data collected indicates that the user 102 does not use a network connection in a significant way at or near location 108 during the commute (e.g., even if the device 104 remains at the location 108 long enough to justify connection), such that the device 104 determines that connection behavior according to connection scheme 120 is the best fit for the user 102's typical behavior, as a cellular connection is either sufficient for the user 102's network use, or provides a better (e.g., faster) network connection for the device 104. Refraining from scanning for, and connecting to, the access point 114 also prevents battery drain while at location 108.

In some examples, connection behavior of device 104 is determined based on a network scan pattern or scan patterns that is accessed and/or generated on the device 104. The network scan pattern indicates when and how the device 104 scans for available network access points (e.g., access points 112, 114, and 116, etc.). Further, the scan pattern of the device 104 may change (e.g., different scan patterns may be generated or accessed over time based on collected data, etc.), causing the device 104 to increase, decrease, modify, or disable scanning. As the device 104 scans for access points according to network scan patterns, the device 104 automatically connects to access points in a connection scheme (e.g., connection schemes 118, 120, etc.) according to the network scan pattern(s). For instance, if it is determined that the device 104 should not connect to access point 114 at location 108, the device 104 may generate a scan pattern that reduces or prevents scanning when at or near location 108 (e.g., define a geofence around a region within which scanning should not be performed, identify locations where scanning should not be performed, etc.). Alternatively, or additionally, the scan pattern may indicate to specifically refrain from scanning for the particular access point 114 or type of access point 114.

It should be understood that, while the examples herein primarily describe scanning for and connecting to Wi-Fi and cellular network access points, other types of networks and/or access points may be used without departing from the description (e.g., BLUETOOTH™ wireless networks, near-field communication (NFC) networks, different cellular networks, etc.).

Figure 2:
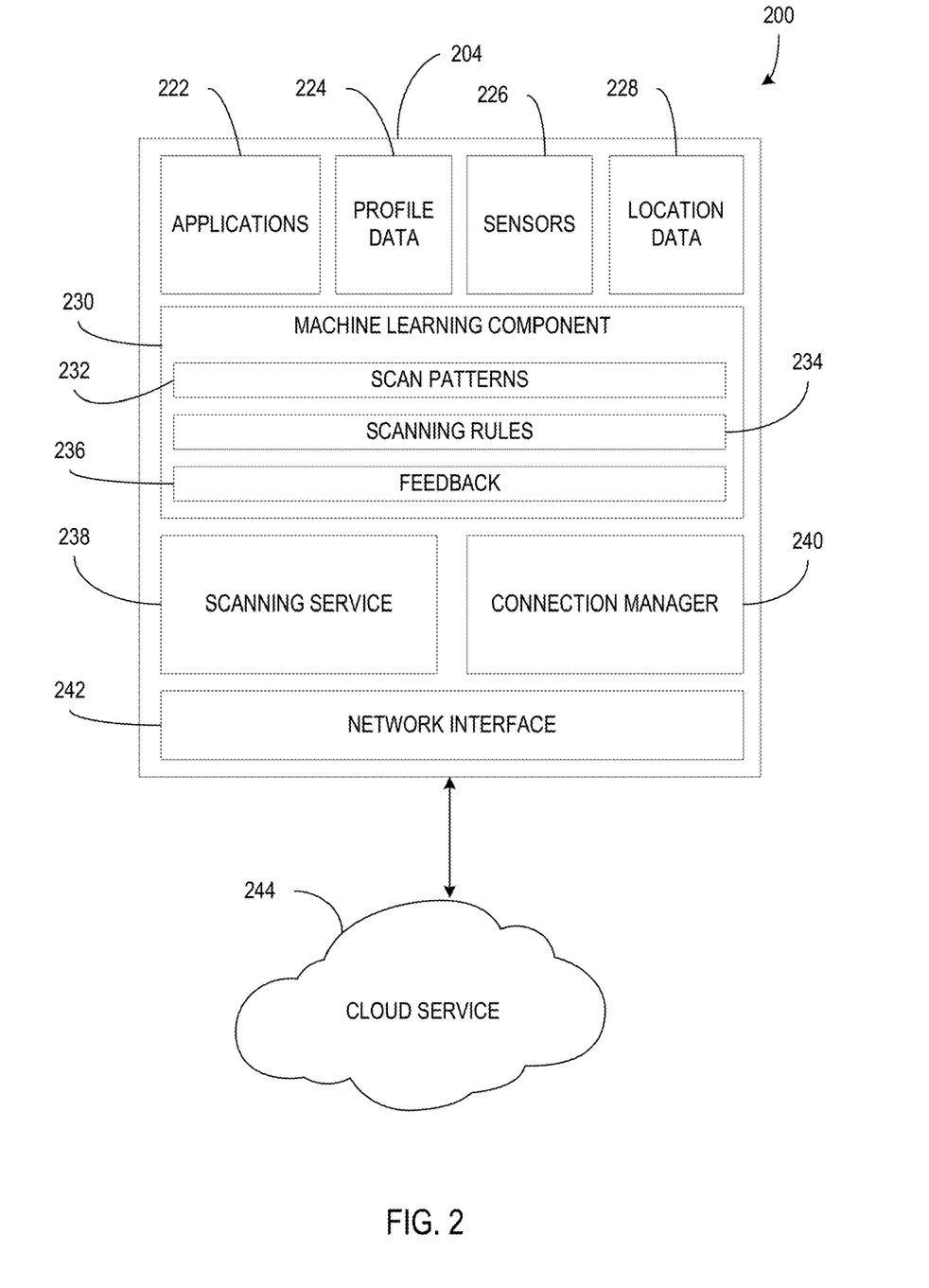
FIG. 2 is an exemplary block diagram illustrating a system including a computing device configured to scan for network access points and improve access point scanning according to an embodiment.

FIG. 2 is an exemplary block diagram illustrating a system 200 including a computing device 204 configured to scan for network access points and improve access point scanning according to an embodiment. The device 204 includes a variety of software, firmware, and/or hardware components that are configured to enable the device 204 to perform typical computer operations as well as the operations pertaining to scanning for and/or connecting to network access points as described herein. In particular, the device 204 includes applications 222, profile data 224, sensors 226 (and associated sensor data), and location data 228. Further, the device 204 includes an ML component 230 that uses scan patterns 232 and scanning rules 234 to determine how the device 204 scans for access points and improve aspects of the scanning process based on feedback 236. The scanning service 238 and connection manager 240 are user-mode software components that operate to enable the device 204 to scan for access points, create connections to access points, and otherwise manage connections based on user input, input from the ML component 230, and/or input from other components. The network interface 242 may include software and/or hardware that communicates over one or more types of network connections (e.g., Wi-Fi, cellular, etc.) and it may be managed or otherwise controlled by the connection manager 240, scanning service 238, or other application/component of the device 204.

Applications 222 may be any sort of software component installed on the device 204 for use by a user or other application. For instance, applications 222 may include office applications, social media applications, shopping applications, game applications, or the like.

Profile data 224 includes one or more profiles associated with the device 204 and/or users of the device 204. For instance, a profile may be a user profile, such that it includes profile data associated with a specific user using the device 204. In some examples, a user may use his/her user profile on more than one device and/or the device 204 may include multiple user profiles associated with different users. Alternatively, or additionally, a profile may be a device profile that is associated with the device 204 in particular. In some examples, a profile is associated with both a user and the device 204. A profile may include data described as personal digital assistant data, sign-on data, user preference data, calendar data, mobility pattern data, device usage history data, network usage history data, access point or hotspot subscription data, other device state data, etc. Profile data may include current state data associated with the device and/or historic state data associated with the device. Further, profile data 224 may include data collected from the applications 222, sensors 226, and/or location data 228 which may then be associated with the profile of the profile data 224 and used by the ML component 230.

Sensors 226 include hardware and/or software components of the device 204 that are configured to collect information from a user, environment, other devices, etc. For instance, sensors 226 may include cameras, microphones, gyroscopes, touch/impact sensors, accelerometers, etc. Sensors 226 may collect data for storage or use by other applications (e.g. applications 222, etc.), the ML component 230, a user or device profile, etc.

Location data 228 indicates the current or historical location of the device 204. It may be gathered by communication with other devices, routers, access points (e.g., Wi-Fi access points, etc.), satellites (Global Positioning System (GPS)), or the like. In some examples, location data 228 is in the form of coordinates, such as latitude and longitude coordinates. Further, location data 228 may include date-time data indicating when the device 204 was at the indicated location. Location data 228 may be provided to, used by, and/or stored by applications 222, profiles, the ML component 230, etc.

The ML component 230 generates and stores scan patterns 232 based on scanning rules 234. By providing a scan pattern 232 to the scanning service 238 and/or connection manager 240 through an application programming interface (API) or the like (e.g., a "SetParameter( )" API to define a scan frequency and/or scan iteration value of a scan pattern, etc.), the device 204 is configured to scan for access points based on the current state and/or historical patterns of use of the device 204. For instance, when the scan pattern 232 information is provided to the scanning service 238, the scanning service 238 determines whether or not to instruct the hardware network interface to scan for access points. Further, if the scan pattern 232 indicates that a scan should be run, the connection manager 240 may be queried to determine if there is a connection over Wi-Fi and other related connection state data, which may be used to determine whether the current connection is sufficient. In some examples, scanning rules 234 are evaluated and scan patterns 232 are generated based on profile data 224 and associated data (e.g., data from applications 222, sensor data from sensors 226, location data 228, etc.). For instance, profile data 224 may include a user profile that indicates a mobility pattern of a user based on gathered historical location data stored in association with the user profile. When the user associated with the user profile is using the device 204, the ML component 230 applies scanning rules 234 to the profile data 224 of the user profile in order to determine a scan pattern 232 that fits the user's mobility pattern.

Scan patterns 232 may indicate how and/or when to scan for access points based on aspects of scanning, such as scan frequency (how often to initiate a scan period), scan iteration value (a number of scans to execute during each scan period), channel hints (indications of particular networks to scan for during a scan period), etc. Further, a scan pattern 232 may be categorized based on the defined aspects. For instance, a scan pattern 232 may be categorized as a 'slow' scan pattern, which may indicate that the scan pattern has a scan frequency of 10 minutes and a scan iteration value of 3 for each scan period. Alternatively, the scan pattern 232 may be categorized as a 'medium' scan pattern, indicating the scan pattern has a scan frequency of 3 minutes and a scan iteration value of 10 for each scan period, or as a 'fast' scan pattern, indicating the scan pattern has a scan frequency of 1 minute and a scan iteration value of 10 iterations for each scan period. Other scan patterns are also possible, including a 'no scan' scan pattern that, when used, causes the device 204 to refrain from scanning for access points.

Channel hints of scan patterns may include defined channel identifiers of access points that have previously been used, access points that were last used, access points that are flagged as 'trusted' access points, or the like. Additionally, or alternatively, channel hints may include values and/or rules, such that access points that match or satisfy the values and/or rules are favored for connection during a scanning period (e.g., channel hints may indicate that access points that are encrypted, or access points that use a particular frequency range should be prioritized and/or identified, etc.). In some examples, channel hints may indicate channels to avoid, rather than to prioritize for scanning.

Scanning rules 234 are evaluated based on various types of data associated with the device 204 to determine a scan pattern 232 that most closely matches the current state of the device 204. Scanning rules 234 may include one or more input values that may be weighted and evaluation thresholds to compare with the input values to determine whether the scanning rule is satisfied and/or to what extent the scanning rule is satisfied (e.g., a scanning rule evaluation may be binary or it may have a prediction confidence score/percentage, or the like, etc.). In a simple example, a scanning rule 234 may include a single input value with a weight that maps to a scan pattern and provides a prediction confidence score associated with the scan pattern. In another example, when the device 204 is within a defined proximity of a location (e.g., the user's home, etc.), a scanning rule 234 indicates use of the scan pattern 232 that causes the device 204 to scan for access points that are known to be at the location. Alternatively, or additionally, a scanning rule 234 may indicate use of a scan pattern 232 that causes the device 204 to refrain from scanning for access points in order to save battery power until a destination is reached when the device 204 is travelling at a sufficient speed (e.g., the current location data 228 is changing at or above a defined rate, etc.). Each aspect of profile data considered during evaluation of a scanning rule 234 may have a weight applied (e.g., a high velocity of the device 204 with respect to nearby access points may be weighted heavily by scanning rules 234 indicating to reduce scanning, while a time of day may be considered by many different scanning rules 234 but weighed more lightly if it does not provide a strong indication of a particular scan pattern or set of scan patterns, etc.).

In some examples, the scan patterns 232 and associated scanning rules 234 are associated with and/or unique to a profile among other profiles, such as a device-based profile or a user-based profile. As a result, the scanning done by a device according scan patterns 232 is adjusted as described herein to fit the typical behavior of the associated user and/or device. For instance, the weights applied to various input data in a scanning rule 234 may be different values from any other scanning rule 234 on a different device or associated with a different user's user profile.

After a scan pattern 232 is used by the device 204 to scan for access points, feedback 236 is collected and provided to the ML component 230. The feedback 236 may include scanning results from applications and/or other components of the device 204, such as the type of network in use, the type of network that was scanned for, whether access points were identified, whether connection was formed with an access point, an amount of time required to find and/or connect to an access point, whether a connection to an access point provides access to the Internet or other network, etc. Feedback 236 may further include user feedback, such as an indication from the user as to whether the scan was successful, whether an access point performs to the user's satisfaction, whether the battery of the device 204 is being drained too quickly, etc. In an example, if a user of the device 204 frequently accesses network settings to manually adjust the settings, it may be considered feedback that the user is unsatisfied with the current state of the network connection. Alternatively, or additionally, a connection state monitor component may provide consistent feedback regarding whether there is a connection or not, and this connection feedback is provided to the ML component 230.

In some examples, the data used by the ML component 230 may be purged or cleansed in order to keep the machine learning input data fresh. The data purge may occur based on a defined time period and/or a defined quantity of data collected. For instance, machine learning input data older than 6 months may be purged.

The ML component 230 uses the feedback 236 and/or other data (e.g., application data from applications 222, profile data 224, sensor data from sensors 226, location data 228, etc.) to update, adjust, and/or improve the scan patterns 232 and/or the scanning rules 234 according to machine learning techniques. The ML component 230 may include aspects of mathematical models, weighted feedback values, pattern matching, crowd-sourcing, or the like.

The ML component 230 may include one or more scanning performance goals which derive the updating and/or adjusting of scan patterns 232 and scanning rules 234. For instance, a scanning performance goal may cause scan patterns 232 and/or scanning rules 234 to be adjusted to improve the consistency of the connection of the device to a network and/or to preserve battery power of the device by reducing scanning in areas where a network connection is unlikely to be found. Further, scanning performance goals may include improving recovery time from a failed connection state. In order to pursue scanning performance goals, the ML component 230 may apply updates or adjustments to the scan patterns 232 and/or the scanning rules based on feedback 236 and other data, as well as weight values applied to the feedback 236 and other data, past updates/adjustments of scan patterns 232 and/or scanning rules 234, past feedback data, results of past updates/adjustments, statistical analysis of past data, etc.

Updates or adjustments to a scan pattern 232 may include adjusting the scan frequency, the scan iteration value, and/or the channel hints. Updates or adjustments to a scanning rule 234 may include adjusting the number and/or weight of input values associated with the scanning rule 234, one or more evaluation thresholds of the scanning rule 234, and/or the scan pattern 232 associated with the scanning rule 234.

User feedback may be used as feedback data 236 by the ML component 230. For instance, when a user of the device confirms that a scan pattern successfully found an appropriate network access point, connected in an acceptable amount of time, etc., the associated scan patterns 232 and/or scanning rules 234 may be adjusted to reinforce that the scan pattern 232 used to do the successful scan was correctly determined by the associated scanning rules 234. Alternatively, if user feedback indicates that a scan pattern 232 has been incorrectly or inefficiently determined, the ML component 230 may adjust scan patterns 232 and/or scanning rules 234 such that the incorrectly determined scan pattern 232 is less likely to be determined in similar situations in the future (e.g., weights of input values or thresholds of associates scanning rules 234 may be adjusted, etc.).

In some examples, the ML component 230 comprises a trained regressor such as a random decision forest, directed acyclic graph, support vector machine, neural network, or other trained regressor. The trained regressor may be trained using the input and feedback data described above. Examples of trained regressors include a convolutional neural network and a random decision forest. It should further be understood that the ML component 230, in some examples, may operate according machine learning principles and/or techniques known in the art without departing from the systems and/or methods described herein.

An ML component 230 may be available at the computing device 204. In alternative examples, the ML component 230 may be disposed at another computing device (e.g., a networked device associated with the cloud service 244, etc.) which receives and processes the data from the computing device 204. Where the ML component 230 is at the computing device 204, it comprises software stored in memory and executed on a processor in some cases. In some examples, the ML component 230 is executed on an FPGA or a dedicated chip. For example, the functionality of the ML component 230 may be implemented, in whole or in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The ML component 230 is arranged to execute the methods described herein to determine scan pattern and scanning rule adjustments in a manner which allows for improved performance when scanning for network access points while preserving battery power of the device 204.

In an example, the ML component 230 or other ML engine may make use of training data pairs when applying machine learning techniques and/or algorithms. Millions of training data pairs (or more) may be stored in a machine learning data structure. In some examples, a training data pair includes an input or feedback data value paired with a scanning adjustment value. The pairing of the two values demonstrates a relationship between the input or feedback data value and the scanning adjustment value that may be used by the ML component 230 to determine future scanning adjustments according to machine learning techniques and/or algorithms.

The device 204 may be connected to a cloud service 244 that is composed of one or more computing devices, data structures, and the like. The cloud service 244 may be used to store the data of the device 204 described above outside of the device 204 so that the data can be accessed in the event of a loss or failure of the device 204. Additionally, profile data 224 and other associated data (e.g., data associated with a particular user profile, etc.) may be shared across multiple devices by accessing the cloud service 244. Scan patterns 232 and scanning rules 234 associated with a profile may also be distributed to the cloud service 244 and shared across several devices as well. The shared profile data may be maintained via a consistent connection to the cloud service 244, or it may be updated periodically when a connection between the device 204 and the cloud service 244 is available.

In some examples, profile data 224, data related to the success or failure of scan patterns, and other related data that is stored on the cloud service 244 is anonymized and "crowd-sourced" to be used by other computing devices with associated ML components 230 to identify scan patterns 232. For instance, computing devices passing through a public area that provides a free network access point may upload data associated with the location and the access point to the cloud service 244 (e.g., data indicating a successful connection to the network, the network name, a channel number, other context information, etc.). When other computing devices pass through the location at a later time, the past uploaded data may be accessed and used to determine a scan pattern that provides a channel hint to the provided free network access point. Alternatively, or additionally, an access point that provides a poor-quality connection to several computing devices may result in data being stored in the cloud service 244 that causes future computing devices to avoid scanning for and/or connecting to the poor-quality access point.

Figure 3:
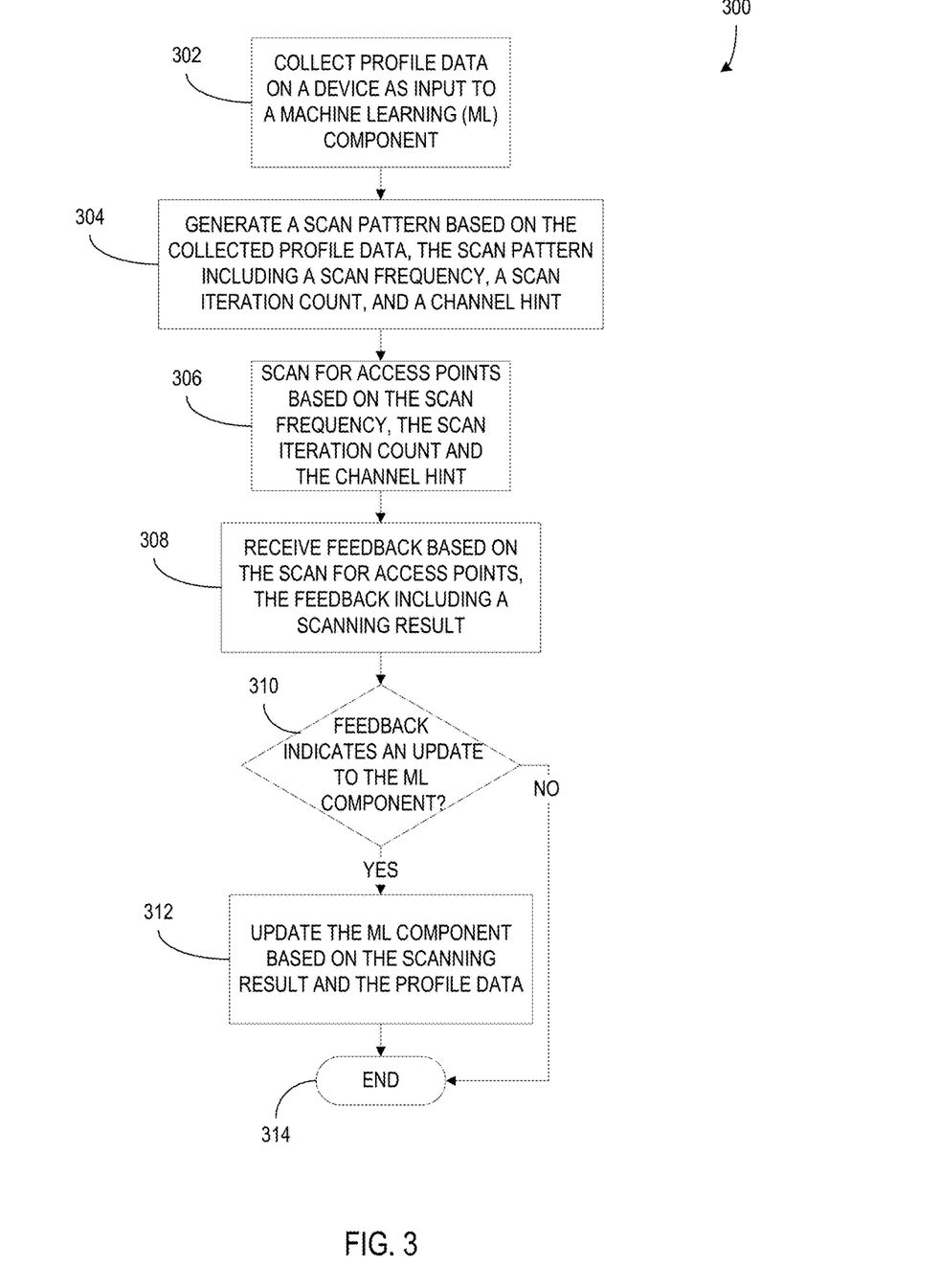
FIG. 3 is an exemplary flow chart illustrating operation of a computing device to scan for access points and applying a scanning result of the scan using machine learning according to an embodiment.

FIG. 3 is an exemplary flow chart 300 illustrating operation of a computing device (e.g., device 204, etc.) to scan for access points and applying a scanning result of the scan using machine learning according to an embodiment. At 302, the device collects profile data as input for an ML component. The profile data may include current and/or historical data associated with the device and/or a user of the device. For instance, the profile data may include application data, location data, sensor data, other profile data, etc. Further the profile data may be collected from the device itself (e.g., via sensors, from the memory of the device, etc.) or from other sources (e.g., a cloud server/device, other devices, etc.) over a network connection. The ML component may be installed or otherwise present on the device. In alternative examples, the ML component may be on a cloud server or other device apart from the device.

At 304, a scan pattern is generated based on the collected profile data, wherein the scan pattern includes a scan frequency, a scan iteration count, and a channel hint. The scan pattern generated may be a scan pattern that best fits the collected profile data based on one or more scanning rules as described above. For instance, when the profile data indicates a high likelihood of finding an access point and/or a need for network access over an access point, a scan pattern may be generated with a high scan frequency and/or high scan iteration count to identify an access point as efficiently as possible. Alternatively, when the profile data indicates a low likelihood of finding an access point and/or a lack of a need for network access over an access point, the generated scan pattern may have a low scan frequency and/or low scan iteration count to reduce battery drain due to frequent access point scanning.

At 306, the device scans for access points according to the generated scan pattern. The scanning may occur at regular intervals based on the scan frequency of the scan pattern and, during each scanning period, a number of scans are executed based on the scan iteration count. A channel hint provided by the scan pattern may provide information to enable the device to efficiently identify particular access points and/or access points that are indicated by the channel hint.

Upon scanning for access points, the device receives feedback based on the scanning at 308. The feedback includes a scanning result. In some examples, the feedback/scanning result includes whether an access point was found, whether an access point was connected to, time taken to identify and/or connect to an access point, etc. Further, the feedback may include feedback gathered from a user of the device indicating a level of satisfaction of the user with the scanning process and/or connectivity of the device.

At 310, if the feedback indicates that the ML component should be updated according to machine learning techniques/principles, the ML component is updated based on the scanning result and profile data at 312. When the ML component is updated, process ends at 314.

Alternatively, if the ML component need not be updated based on the feedback at 310, the process ends at 314.

Figure 4:
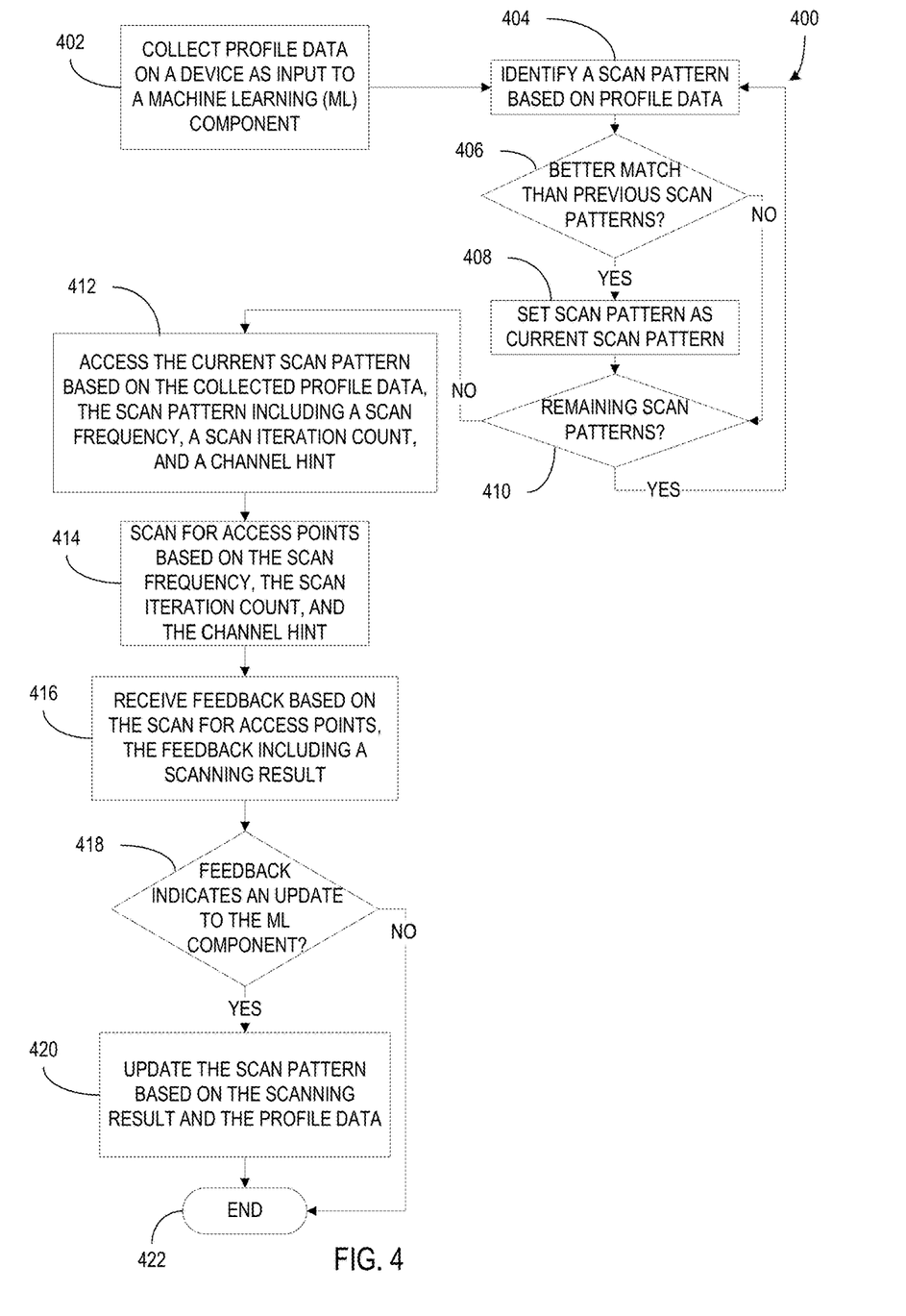
FIG. 4 is an exemplary flow chart illustrating operation of a computing device to scan for access points based on a determined scan pattern and applying a scanning result of the scan using machine learning according to an embodiment.

FIG. 4 is an exemplary flow chart 400 illustrating operation of a computing device to scan for access points based on a determined scan pattern and applying a scanning result of the scan using machine learning according to an embodiment. At 402, the device collects profile date as input to a an ML component (e.g., ML component 230, etc.). At 404, a scan pattern is identified based on the collected profile data. In an example, scanning rules are evaluated as described herein based on the collected profile data and a scan pattern associated with an evaluated scanning rule is identified. The evaluation of scanning rules may result in a prediction confidence score of a scan pattern indicating a likelihood that the scan pattern will provide optimized, improved, and/or reduced battery usage (e.g., resulting in power savings on the device) while maintaining the user experience in the current environment (e.g., a scan pattern may be effective when it scans for access points near access points or when it refrains from scanning for access points when few or no access points are available, etc.). The prediction confidence score of a scan pattern based on evaluation of scanning rules may be updated by the ML component when the scan pattern and/or scanning rules are adjusted based on feedback and other associated data as described herein. Thus, the prediction confidence score of a scan pattern associated with a particular state, environment, set of profile data, etc. may change based on past success/failure rates and the depth of data (e.g., profile data, etc.) that has been processed by the ML component.

At 406, the identified scan pattern is compared to previously identified scan patterns to determine if it is a better match for the current state and/or environment. The comparison may include comparing the prediction confidence scores of the scan patterns. If a first scan pattern has a higher prediction confidence score than a second scan pattern, the first scan pattern is likely a better match for the current state or environment than the second scan pattern.

If the identified scan pattern is a better match, the identified scan pattern is set as the current scan pattern at 408. Alternatively, if the identified scan pattern is not a better match, the process proceeds to 410. At 410, the device determines whether there are any remaining scan patterns to consider. If so, another scan pattern is identified based on the profile data at 404. If not, the process proceeds to 412.

At 412, the current scan pattern is accessed based on the collected profile data, wherein the scan pattern includes a scan frequency, a scan iteration count, and a channel hint, as described above with respect to 304. At 414, the device scans for access points according to the accessed scan pattern.

Upon scanning for access points, the device receives feedback based on the scanning at 416. The feedback includes a scanning result. At 418, if the feedback indicates that the ML component should be updated according to machine learning techniques/principles, the scan pattern of the ML component is updated based on the scanning result and profile data at 420. When the ML component is updated, process ends at 422.

Alternatively, if the ML component does not need to be updated based on the feedback at 418, the process ends at 422.

Additional Example Scenarios

Aspects of the disclosure enable various additional scenarios, such as next described.

In an example, a user of a device stays in a hotel on several trips to a city. The user's device collects profile data associated with the hotel's location and access points that are in range of the hotel. On later visits to the hotel, the device runs an access point scan targeted at access points previously used at the hotel based on the collected profile data. Further, the collected profile data may be supplemented with crowd-sourced data from other users that have previously stayed at or around the hotel.

In another example, a user's calendar includes a meeting at a location at a defined time. The user's device collects the calendar data and generates a scan pattern based thereon. The scan pattern may cause the device to refrain from scanning until the device is in range of the location of the meeting. Further, the scan pattern may cause the device to run a targeted scan at the meeting location for known and/or trusted access points once the device is in range of the meeting location and/or at the defined time of the meeting.

In another example, a user has customized scanning rules/patterns based on their mobility patterns, etc., associated with their user profile and they get a new device. The customized scanning rules/patterns are downloaded from the cloud service onto the new device when the user signs in to the new device, enabling the new device to immediately begin operating in accordance with the user's typical mobility patterns etc.

In another example, a user's device is connected to a car's BLUETOOTH™ network, indicating that it is likely the device is traveling in the car. The device queries the BLUETOOTH™ interface to confirm that the connection is to a car. Upon identifying the connection to the car, the device generates a scan pattern that causes the device to refrain from scanning for Wi-Fi access points while the device is traveling in a car.

Exemplary Operating Environment

Figure 5:
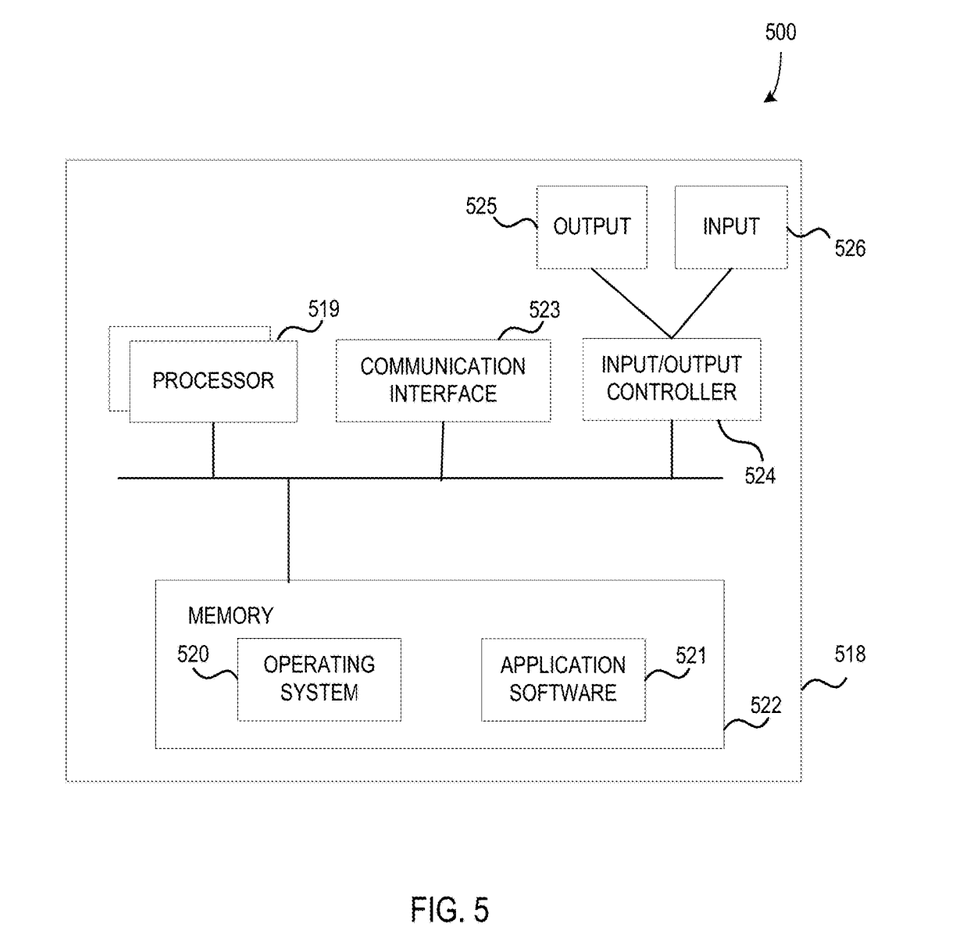
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, scanning for access points based on a scan pattern and updating the scan pattern based on feedback according to machine learning techniques may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device

525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

In some examples the computing apparatus 518 detects voice input, user gestures or other user actions and provides a natural user interface (NUI). This user input may be used to author electronic ink, view content, select ink controls, play videos with electronic ink overlays and for other purposes. The input/output controller 524 outputs data to devices other than a display device in some examples, e.g. a locally connected printing device.

NUI technology enables a user to interact with the computing apparatus 518 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

This NUI technology may be used to obtain and/or generate the profile data described herein.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for improving network access point scanning efficiency comprising:

at least one processor; and at least one memory comprising computer program code, the at least one memory and the computer program code configured to, with the at least one processor, cause the at least one processor to:

collect profile data on a device as input to an ML component;

generate, by the ML component, a scan pattern based on the collected profile data, the scan pattern including a scan frequency, a scan iteration count, and a channel hint;

scan for access points based on the scan frequency, the scan iteration count, and the channel hint;

receive, by the ML component, feedback based on the scan for access points, the feedback including a scanning result; and update the ML component based on the scanning result and the profile data.

The system described above, wherein the collected profile data is associated with at least one of a device profile and a user profile.

The system described above, wherein the collected profile data includes a mobility pattern associated with the user profile, the mobility pattern including historical location data and connection data associated with the user profile.

The system described above, wherein the mobility pattern is further associated with the device profile.

The system described above, wherein the scan frequency represents how often to initiate a scan period, the scan iteration value represents a number of scans to execute during a scan period, and the channel hint represents an indication of particular networks to scan for during a scan period.

The system described above, wherein the received feedback includes feedback from at least one of a user or an application.

The system described above, the at least one memory and the computer program code configured to, with the at least one processor, further cause the at least one processor to upload the profile data, scan pattern, and received feedback to a cloud service.

The system described above, wherein collecting profile data on a device as input to an ML component includes collecting crowd-sourced profile data from the cloud service; and generating, by the ML component, a scan pattern based on the collected profile data includes generating a scan pattern based on the collected crowd-sourced profile data from the cloud service.

The system described above, wherein generating, by the ML component, a scan pattern based on the collected profile data includes identifying one or more scan patterns based on applying one or more network scanning rules to the collected profile data, the one or more scan patterns having prediction confidence scores indicating a likelihood of optimizing battery usage while maintaining user experience; and selecting a scan pattern from the one or more scan patterns with the highest prediction confidence score for generation.

The system described above, wherein updating the ML component based on the received feedback, the scan pattern, and the profile data includes applying one or more weight values to the received feedback, the scan pattern, and the profile data.

A computerized method for improving network access point scanning efficiency comprising:

collecting profile data on a device as input to an ML component;

accessing, by the ML component, a scan pattern based on the collected profile data, the scan pattern including a scan frequency, a scan iteration count, and a channel hint;

scanning for access points based on the scan frequency, the scan iteration count, and the channel hint;

receiving, by the ML component, feedback based on the scan for access points, the feedback including a scanning result; and updating, by the ML component, the accessed scan pattern based on the scanning result, the scan pattern, and the profile data.

The computerized method described above, wherein the collected profile data is associated with at least one of a device profile and a user profile.

The computerized method described above, wherein the collected profile data includes a mobility pattern associated with the user profile, the mobility pattern including historical location data and connection data associated with the user profile.

The computerized method described above, wherein the mobility pattern is further associated with the device profile.

The computerized method described above, wherein the profile data includes one or more of location data, sensor data, connection history data, or access point subscription data.

One or more computer storage media having computer-executable instructions for improving network access point scanning efficiency that, upon execution by a processor, cause the processor to at least:

collect profile data on a device as input to an ML component;

generate, by the ML component, a scan pattern based on the collected profile data, the scan pattern including a scan frequency, a scan iteration count, and a channel hint;

scan for access points based on the scan frequency, the scan iteration count, and the channel hint;

receive, by the ML component, feedback based on the scan for access points, the feedback including a scanning result; and update the ML component based on the scanning result, the scan pattern, and the profile data.

The one or more computer storage media described above, wherein the collected profile data is associated with at least one of a device profile and a user profile.

The one or more computer storage media described above having further computer-executable instructions that, upon execution by a processor, cause the processor to at least upload the profile data, scan pattern, and received feedback to a cloud service.

The one or more computer storage media described above, wherein generating, by the ML component, a scan pattern based on the collected profile data includes identifying one or more scan patterns based on applying one or more network scanning rules to the collected profile data, the one or more scan patterns having prediction confidence scores; and selecting a scan pattern from the one or more scan patterns with the highest prediction confidence score for generation.

The one or more computer storage media described above, wherein updating the ML component based on the received feedback, the scan pattern, and the profile data includes applying one or more weight values to the received feedback, the scan pattern, and the profile data.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for scanning for access points based on a generated scan pattern and updating the scan pattern based on feedback according to machine learning techniques. The illustrated one or more processors 519 together with the computer program code stored in memory 522 constitute exemplary processing means for scanning for access points based on a generated scan pattern and updating the scan pattern based on feedback according to machine learning techniques.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for improving network access point scanning efficiency comprising:
    at least one processor; and
    at least one memory comprising computer program code, the at least one memory and the computer program code configured to, with the at least one processor, cause the at least one processor to:
    collect profile data on a device as input to a machine learning (ML) component, the profile data comprising a mobility pattern associated with the user profile, the mobility pattern including historical location data and connection data associated with the user profile;
    determine a current location of the device corresponds to the mobility pattern;
    generate, by the ML component, a scan pattern based on the current location of the device and the collected profile data, the scan pattern including a scan frequency, a scan iteration count, and a channel hint;
    scan for access points using the scan frequency with the scan iteration count and using the channel hint, in accordance with the generated scan pattern;
    receive, by the ML component, feedback based on the scan for access points, the feedback including a scanning result; and
    update the generated scan pattern based on the scanning result and the profile data.

2. The system of claim 1, wherein the collected profile data is associated with at least one of a device profile and a user profile.

3. The system of claim 2, wherein the collected profile data includes a mobility pattern associated with the user profile, the mobility pattern including historical location data and connection data associated with the user profile.

4. The system of claim 3, wherein the mobility pattern is further associated with the device profile.

5. The system of claim 1, wherein the scan frequency represents how often to initiate a scan period, the scan iteration value represents a number of scans to execute during a scan period, and the channel hint represents an indication of particular networks to scan for during a scan period.

6. The system of claim 1, wherein the profile data comprising user subscription data.

7. The system of claim 1, the at least one memory and the computer program code configured to, with the at least one processor, further cause the at least one processor to upload the profile data, scan pattern, and received feedback to a cloud service.

8. The system of claim 1, wherein collecting profile data on a device as input to an ML component includes collecting crowd-sourced profile data from the cloud service; and
    generating, by the ML component, a scan pattern based on the collected profile data includes generating a scan pattern based on the collected crowd-sourced profile data from the cloud service.

9. The system of claim 1, wherein generating, by the ML component, a scan pattern based on the collected profile data includes identifying one or more scan patterns based on applying one or more network scanning rules to the collected profile data, the one or more scan patterns having prediction confidence scores indicating a likelihood of optimizing battery usage while maintaining user experience; and
    selecting a scan pattern from the one or more scan patterns with the highest prediction confidence score for generation.

10. The system of claim 1, wherein updating the ML component based on the received feedback, the scan pattern, and the profile data includes applying one or more weight values to the received feedback, the scan pattern, and the profile data.

11. A computerized method for improving network access point scanning efficiency comprising:
    collecting profile data on a device as input to a machine learning (ML) component, the profile data a mobility pattern associated with the user profile, the mobility pattern including historical location data and connection data associated with the user profile;
    determining a current location of the device corresponds to the mobility pattern;
    accessing, by the ML component, a scan pattern based on the current location of the device and the collected profile data, the scan pattern including a scan frequency, a scan iteration count, and a channel hint;
    scanning for access points using the scan frequency with the scan iteration count and using the channel hint, in accordance with the accessed scan pattern;

receiving, by the ML component, feedback based on the scan for access points, the feedback including a scanning result; and updating, by the ML component, the accessed scan pattern based on the scanning result and the profile data.

12. The computerized method of claim 11, wherein the profile data comprises one or more of the following: current state data associated with the device, historic state data associated with the device, data collected from applications executed on the device, and sensors on the device.

13. The computerized method of claim 12, wherein the collected profile data includes a mobility pattern associated with the user profile, the mobility pattern including historical location data and connection data associated with the user profile.

14. The computerized method of claim 13, wherein the mobility pattern is further associated with the device profile.

15. The computerized method of claim 11, wherein the profile data includes one or more of location data, sensor data, connection history data, or access point subscription data.

16. One or more computer storage media having computer-executable instructions for improving network access point scanning efficiency that, upon execution by a processor, cause the processor to at least:

collect profile data on a device as input to a machine learning (ML) component, the profile data comprising a mobility pattern associated with the user profile, the mobility pattern including historical location data and connection data associated with the user profile;

determine a current location of the device corresponds to the mobility pattern;

generate, by the ML component, a scan pattern based on the current location of the device and the collected profile data, the scan pattern including a scan frequency, a scan iteration count, and a channel hint;

scan for access points using the scan frequency with the scan iteration count and using the channel hint, in accordance with the generated scan pattern;

receive, by the ML component, feedback based on the scan for access points, the feedback including a scanning result; and update the ML component based on the scanning result and the profile data.

17. The one or more computer storage media of claim 16, wherein the collected profile data is associated with at least one of a device profile and a user profile.

18. The one or more computer storage media of claim 16 having further computer-executable instructions that, upon execution by a processor, cause the processor to at least upload the profile data, scan pattern, and received feedback to a cloud service.

19. The one or more computer storage media of claim 16, wherein generating, by the ML component, a scan pattern based on the collected profile data includes identifying one or more scan patterns based on applying one or more network scanning rules to the collected profile data, the one or more scan patterns having prediction confidence scores; and selecting a scan pattern from the one or more scan patterns with the highest prediction confidence score for generation.

20. The one or more computer storage media of claim 16, wherein updating the ML component based on the received feedback, the scan pattern, and the profile data includes applying one or more weight values to the received feedback, the scan pattern, and the profile data.

* * * * *